United States Patent [19]

Carter

[11] Patent Number: 5,524,560

[45] Date of Patent: Jun. 11, 1996

[54] SYSTEM FOR CONTROLLING VERTICAL DISPLACEMENT OF AGRICULTURAL IMPLEMENTS INTO THE SOIL

[75] Inventor: Lyle M. Carter, Shafter, Calif.

[73] Assignee: The United States of America as represented by the Department of Agriculture, Washington, D.C.

[21] Appl. No.: 352,650

[22] Filed: Dec. 9, 1994

[51] Int. Cl.$^6$ ................................................. A01C 15/00
[52] U.S. Cl. ........................... 111/200; 111/903; 172/4; 364/424.07
[58] Field of Search ........................ 111/118, 200, 111/900, 903, 904, 135; 172/4, 413; 364/424.07; 324/347, 376; 204/400

[56] References Cited

U.S. PATENT DOCUMENTS

| | | | |
|---|---|---|---|
| 4,031,963 | 6/1977 | Poggemiller et al. | 111/200 X |
| 4,064,945 | 12/1977 | Haney | 172/4 |
| 4,069,774 | 1/1978 | Lofgren et al. | 172/4 X |
| 4,145,980 | 3/1979 | Boots | 111/903 X |
| 4,176,721 | 12/1979 | Poggemiller et al. | 111/903 X |
| 4,342,270 | 8/1982 | Lofgren et al. | 111/904 X |
| 4,355,688 | 10/1982 | Hamm et al. | 172/4 |
| 4,733,355 | 3/1988 | Davidson et al. | 172/4 X |
| 4,913,070 | 4/1990 | Morrison, Jr. | 172/4 X |
| 4,928,607 | 5/1990 | Luigi | 111/904 X |
| 5,033,397 | 7/1991 | Colburn, Jr. | 111/200 X |
| 5,044,756 | 9/1991 | Gaultney et al. | 111/200 X |
| 5,234,060 | 8/1993 | Carter | 172/4 X |
| 5,355,815 | 10/1994 | Monson | 111/903 X |

OTHER PUBLICATIONS

Lyle M. Carter, Automatic Control for Cotton Planter for the Irrigated West, publication No. 42–173 of Agricultural Research Service.

*Primary Examiner*—Terry Lee Melius
*Assistant Examiner*—Victor Batson
*Attorney, Agent, or Firm*—M. Howard Silverstein; John D. Fado

[57] ABSTRACT

A system for maintaining the depth of a planter (or tiller) at a soil depth of optimal moisture content is provided, in which a prior art soil resistivity sensor is improved by including a negative electrode immediately behind the prior art positive electrode as the planter and electrodes extend into the ground during tractor travel over the field. The prior art positive probe is shaped to form a compact ribbon of soil therebeneath that extends from the positive to the new negative probe. This compact ribbon provides a reliable and consistent path for measuring soil resistivity at a soil zone of least electrical resistance, thereby preventing other pathways between the positive electrode and grounded parts of the planter or tiller from undesirably entering the detection system in lieu of the desired pathway of measurement.

The new positive electrode, wedge-shaped above its compression zone, so as to force oncoming soil above the compression zone to flow past the electrode rather than downward, prevents commingling between surface soil and soil being compressed.

A new electronic control system (a) delays the command signal to the planter height adjuster, (b) returns the planter to a pre-selected position or freeze it at its last position whenever the tractor slows down too much or stops, (c) synchronizes control of the planter height adjuster whenever another variable such as ground topography also controls the height, and (d) sychronizes control of two separate height adjusters at opposite ends of a side-by-side array of planters on a single frame.

24 Claims, 6 Drawing Sheets

SYSTEM FOR CONTROLLING VERTICAL DISPLACEMENT OF AGRICULTURAL IMPLEMENTS INTO THE SOIL

FIELD OF INVENTION

The invention pertains to automatically adjusting the distance at which an agricultural implement such as a seed planter or soil tiller extends into the ground in response to varying moisture conditions in the soil.

DESCRIPTION OF THE PRIOR ART

In a paper published in July 1970, entitled "Automatic Control for Cotton Planter for the Irrigated West," by Lyle M. Carter, publication no. 42-173 of the Agricultural Research Service, U.S. Department of Agriculture, it was discussed that improvements in the germination of planted seed may be attained by planting at a level where the soil moisture condition is optimal for germination. Since this level ordinarily varies throughout a field, it is quite difficult for a farmer to accomplish optimal planting everywhere. In many instances, planting at optimal moisture conditions for germination are attained over only about 10% of a field.

An experimental apparatus was described in the 1970 publication that included a measuring (or sensing) device attached adjacent to the planter to a frame common to the planter, so as to move vertically with the planter. The sensing device employed electrodes to measure soil electrical resistance, and raised or lowered the planter and the sensor in response to the measurement, for the purpose of planting at the level of optimal moisture condition for germination throughout a field.

As further disclosed in the 1970 publication, several electrode designs were employed, none being satisfactory. The most effective design included a generally J-shaped positive electrode, except that there was no upward extension on the short side of the "J". In operation, the generally J-shaped electrode compacted the oncoming soil so as to form a narrow compacted ribbon of soil generally parallel to and below the ground su face. The ribbon, as it formed, passed immediately below in touching engagement with the lowest surface of the electrode.

The planter apparatus itself provided the "negative" electrode at its multiple points of contact with the soil, thereby providing multiple electrode pairs, or multiple resistivities, in parallel, between the positive J-shaped electrode and: (a) the planter shoe; (b) the seed firming wheel; or (c) covering devices or anything else in contact with the soil. In any system with parallel resistivities, the least resistive path contributes the major response in an electrical circuit. Thus, in this prior art device, depending upon variable soil density, moisture content variation by depth, organic material distribution within the soil, and so forth, a different resistive pathway at any given moment may have provided the least resistive pathway. As a result, the electrical pathway was not constant and the planter was not maintained at a level of optimal soil moisture, except in the most uniform of soil conditions.

Prior to employing the generally J-shaped electrode, a pair of flat springs operating like parallel mini-skis spaced about 1 inch apart, were employed as positive and negative electrodes. They were mounted behind a soil removing blade similar looking to a mini-snow plow, in order to provide a smooth surface for the skis. Spring tension kept the skis in contact with the soil. They sensed the electrical resistance of the soil between them. This arrangement was much less satisfactory than the later multiple electrode arrangement with the generally J-shaped electrode. More specifically, soil colloids and other soil materials ultimately formed a film of semi-conducting-like materials on the underside of the spring electrodes increasing the interface resistance between spring and soil. Thus, with time, the sensed resistance increased and the control commanded the blade to go deeper irrespective of the real soil moisture. In addition, variations in soil density caused a variable volume of soil to be included in the electrical pathway between the two spring electrodes, whereby a drier compacted soil appeared to have the same electrical resistance as a wetter loose soil, which is not an acceptable condition for a control that is seeking constant soil moisture throughout a field. Still further, since the springs were mounted behind and rigidly connected to the soil-removing mini-plow that was being controlled along with the planter, the contact pressure between the springs and the soil would be reduced when the plow was commanded to move upward with the planter and sensor; and with such rapid movement one or more of the springs would tend to lose contact with the soil, thereby resulting in undesirable oscillation, with the overall machine literally bouncing up and down.

SUMMARY

The present invention comprises significant improvements over the device disclosed in the 1970 publication, In general, in addition to the J-shaped positive electrode, a negative electrode is provided rather than relying upon parts of the agricultural implement itself as electrodes. This new electrode extends into the soil immediately behind the positive electrode in the direction of travel. It extends deep enough to contact the ribbon created under the positive electrode throughout the full thickness of the ribbon. Its forwardmost face is wedge-shaped.

The J-shaped positive electrode of the present invention likewise includes a wedge-shaped forwardmost face. As in the J-shaped electrode in the 1970 article discussed above, there is no upward extension or curve on the short side of the "J". Furthermore, the bottom of the "J" never approaches horizontal.

In addition, the new device includes an improved control system that a. permits the user to select a time delay period during which a signal to raise or lower the implement must be maintained before a command is issued to the solenoid valve or valves which control the raising or lowering of the implement;

b. includes means to sense forward movement of the agricultural implement and to prevent soil resistivity control of the implement during periods of minimal or no forward movement.

c. synchronizes raising or lowering commands from a plurality of different variables such as soil moisture content and surface conditions (e.g., see U.S. Pat. Nos. 4,913,070 and 5,234,060).

d. synchronizes control of a plurality of height actuators connected, for example, to opposite ends of a frame, each actuator responding to the same sensed variable; and further may include the additional function of synchronously maintaining each end of the frame at a different level if necessary.

By means of the combination of the ribbon-forming positive electrode and somewhat longer, wedge-shaped negative electrode, it is an object of the present invention to maintain a narrow band of compacted soil extending from the positive to the negative electrode, and to break up this band at the negative electrode so that the band is disrupted behind the negative electrode. This assures that the clearly dominant, least electrically resistive soil pathway (compacted soil provides a pathway of least resistance in comparison to less dense soil) extending from the positive electrode will occur at one location, i.e., in the compact pathway between the positive electrode and the new negative electrode, not between the positive electrode and one or more parts of the agricultural implement itself or other parts of the unit, and not between the positive and negative electrode through soil pathways other than the compact pathway.

Another object is to assure that the same soil pathway, i.e., the pathway between the electrode pair of the present invention, is included in the control circuitry for every and all measurements.

A further object, in the case of a planter, is to break up the compacted soil ribbon at the negative electrode so that the ribbon does not interfere with seed placement components behind the negative electrode.

A yet further object is to provide a negative electrode that is shaped to interact with oncoming soil so as to maintain a substantially constant-sized area on the electrode surface in effective electrical contact with the soil, rather than having a electrode shape that causes the effective electrode area to be variable depending upon field roughness and soil characteristics thereby undesirably causing current flow through the sensing device to be a function both of soil moisture and variable geometry.

An even further object is to provide a negative electrode having a shape that interacts with oncoming soil so as to scour the electrode, and cause soil and trash essentially to flow around the electrode, thereby eliminating or minimizing residues of soil particles or soil solution remaining on the electrode surface, which otherwise may foul or adversely affect reliability of resistivity measurements.

Still another object is to provide a negative electrode having a shape that interacts with oncoming soil so as to scour the electrode in such a manner that the forwardmost point of the electrode is polished by the soil (the leading edge of the wedge continuously is polished by the oncoming soil and provides the effective electrode area, while the electrical conductivity of the rest of the wedge is very low).

Yet another object is to provide a system to more accurately control vertical displacement of an agricultural implement such as a planter or tiller in the soil in response to soil moisture detection (i.e. soil resistivity).

A still further object is to provide a more accurate means of detecting electrical resistance of soil by an electrode pair moving through the soil.

Even yet another object is to provide an integrated control system that provides a plurality of functions including de-control of implement vertical movement when the vehicle is not moving or operating too slowly, and synchronized control of diverse actuator systems.

Other objects and advantages of the present invention will be obvious from the following detailed description taken in conjunction with the drawings in which FIG. 1 is a general view of the system of the present invention.

FIG. 1b is a cross-sectional view of part of FIG. 1a.

FIGS. 3a–d illustrate electronic circuitry of the present invention.

DETAILED DESCRIPTION

Figure 1:
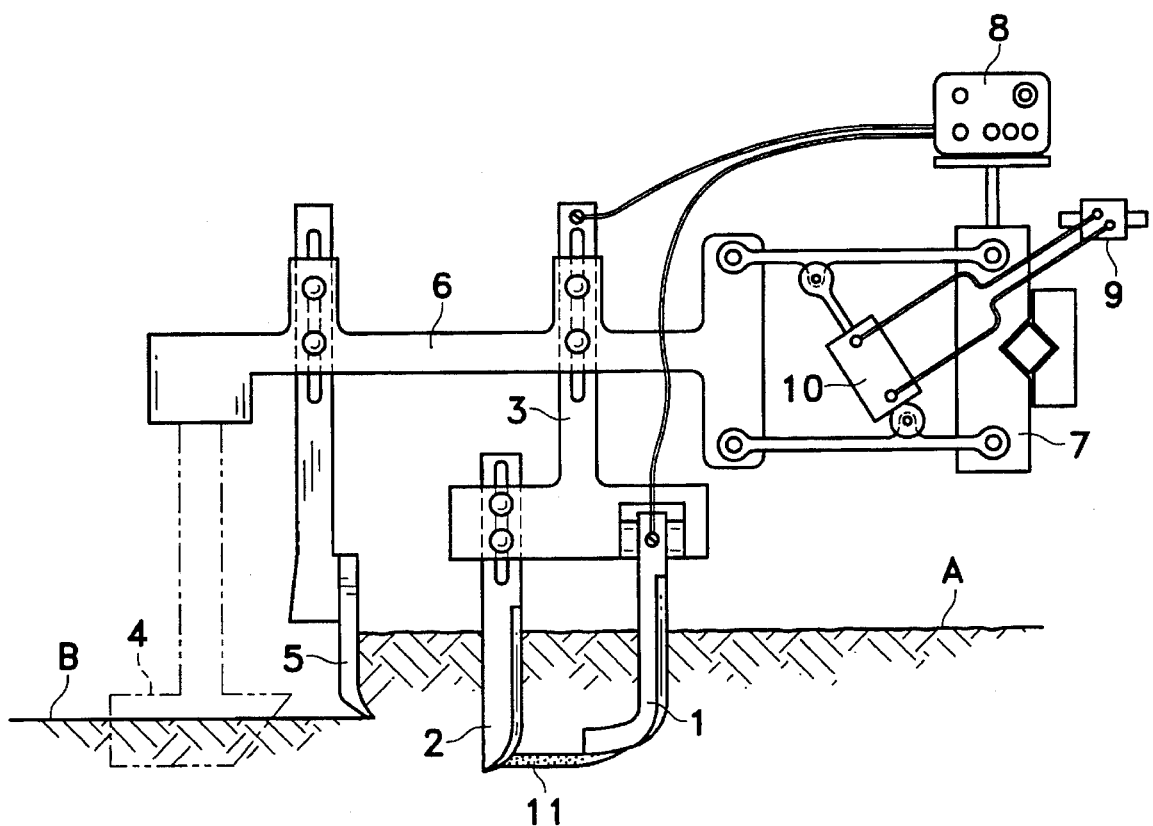

In FIG. 1, reference numerals 1 and 2 designate the positive and negative electrode pair of the present invention that extend into the ground, in the manner of a tilling tool, usually in front of the agricultural implement such as a planter 4 and dry soil removal blade 5, but also may be located behind or beside the implement. Blade 5 essentially lowers the soil level A to level B.

The pair is adjust ably secured to part of a framework 6 which is connected to the implement in the prior art manner. Such frameworks typically are connected to a tractor framework 7.

A control box 8 mounted at a convenient location on the framework, or on the motorized carrier (not shown) bearing the framework, is wired to the electrode pair. The control box is connected to a solenoid or solenoids in a solenoid actuated valve system 9 which controls flow of hydraulic fluids to an actuator or hydraulic device 10, such as disclosed in U.S. Pat. Nos. 4,913,070 and 5,234,060, for raising or lowering an agricultural implement such as a planter or tiller.

Positive electrode 1 is secured to an electrode holder 3 in a conventional manner, e.g., by means of bolts having insulated sleeves where they pass through the electrode. In turn, electrode holder 3, is adjust ably secured to frame 6. The electrode generally is J-shaped without an upturned short leg. It forms a compact ribbon of soil 11 in the oncoming soil that passes under but in contact with the lower most surface of the "J". The width of soil ribbon or band 11 usually will be about the same as the width of the electrode.

The electrode should be thick enough, and constructed of materials such as high carbon steel or stainless steel, in order to insure a robust ability to project like a tilling tool into typical soils that it will encounter.

Figure 1B:
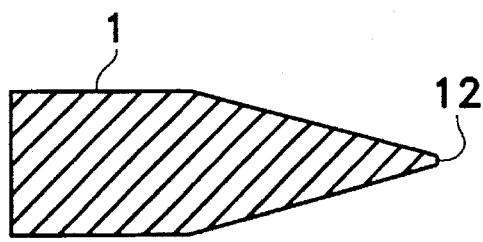
Figure 1C:
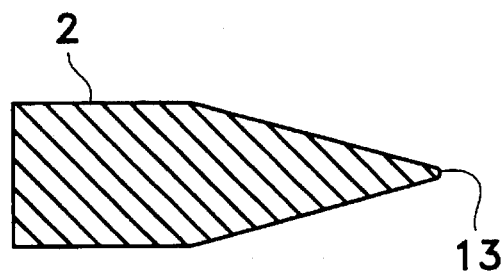
FIG. 1c is a cross-sectional view of electrode 2 in FIG. 1.
Figure 1A:
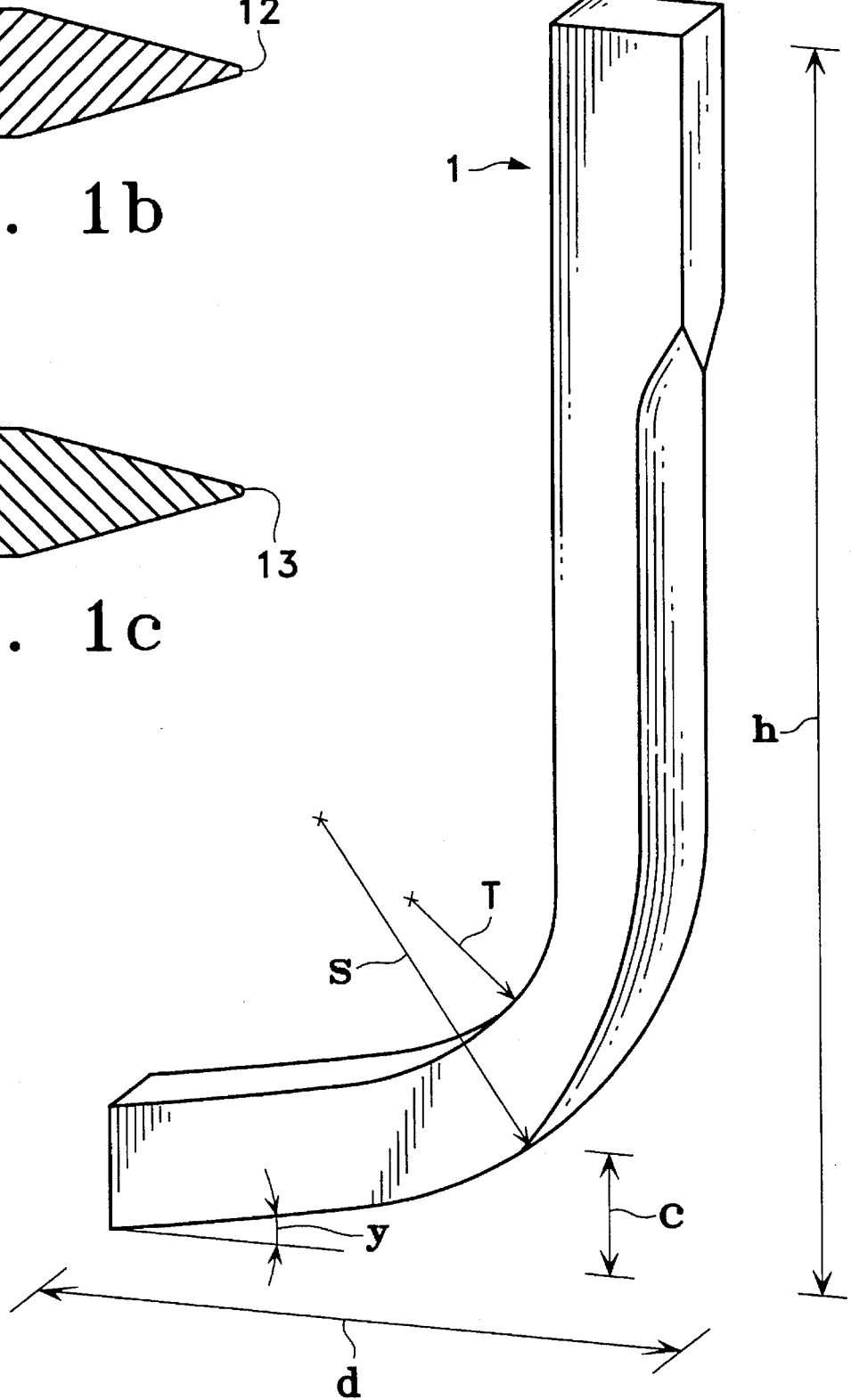
FIG. 1a shows details of electrode 1 in FIG. 1.

Although it generally is J-shaped as was the experimental electrode in the 1970 article described above, there are several features of the present electrode not disclosed in the article. Referring to FIG. 1a, its bottommost section never approaches horizontal. The downward push on the soil continues to the very end of the ribbon's contact with the rearmost part of the electrode. The slope "y" of the electrode preferably is 10° or more, in order to (a) assure that the electrode stays in contact with the soil while moving forward and (b) the bottom of the electrode is scoured by the soil. If the curve of the electrode becomes less than 10°, soil and colloids begin to accumulate, because there is insufficient scouring, thereby resulting in an undesirable, ever-changing electrode-soil area of contact.

Dimension-wise, the compacting zone "c" of the electrode typically is about 1.5 cm in height. Overall height "h" usually is about 35 cm, with a side-to-side thickness of about 1.3 cm and a front-to-back thickness of about 3 cm. The distance "d" from the forwardmost surface of the electrode to its rearwardmost surface is about 15 cm.

The electrode can be fabricated simply by bending a heated length of 1.27 cm×3.18 cm steel bar, and then grinding to shape.

In general, the curve of the "J" should be such that soil band 11 ends up being about 0.3 to 1 cm in thickness, typically about 0.5 cm thick. Exemplary radii dimensions for this curve (see FIG. 1a) are S=10 cm and T=3.8 cm.

Immediately above the compacting zone, the forwardmost face of the electrode is wedge-shaped (see FIG. 1b) preferably being knife-like at its apex 12. As can be seen in FIG. 1, the wedge shape extends above soil surface A. This edge forces drier surface soil to pass around the electrode, thereby essentially preventing such upper drysoil from following the leading edge of the electrode downward and becoming part of the electrical pathway thus presenting false soil resistivity. Preferably, the angle which forms the wedge is no greater than 30°, and edge 12 is sharp enough so as to be no wider than 0.1 cm at its face.

Referring again to FIG. 1, negative electrode 2 may be constructed of the same material as electrode 1. Its typical dimensions are about 35 cm long, about 5 cm wide, and about 0.6 cm thick. Its lowest point typically is about 1.25 cm below the lowest point of electrode 1 so that the oncoming compacted ribbon of soil immediately below electrode I may contact the front face of electrode 2 throughout the full thickness of the ribbon. As shown in the cross-sectional view of electrode 2 in FIG. 1c, it is wedge-shaped in the direction of its movement through the soil, having an apex 13 in the direction of soil movement so as to break up the compacted band of soil and cause oncoming soil to scour the electrode. The apex preferably has the same angle and sharpness as apex 12 in electrode 1.

The distance between electrodes 1 and 2 generally is about 0.5 to 5 cm, preferably about 0.8 to 1.5 cm. The distance between the positive electrode 1 and any other conducting surface other than electrode 2 preferably should be at least 10 times the distance between electrodes 1 and 2.

In operation, depending upon sensed soil resistance, solenoid activated valve system 9 in FIG. 1 may be actuated by control box 8 to open or close conventional hydraulic fluid valves so as to raise or lower the agricultural implement and electrode pair I and 2 with respect to the framework 6, so that the working point of the implement is kept at a level of constant soil moisture content or soil resistivity.

Figure 2:
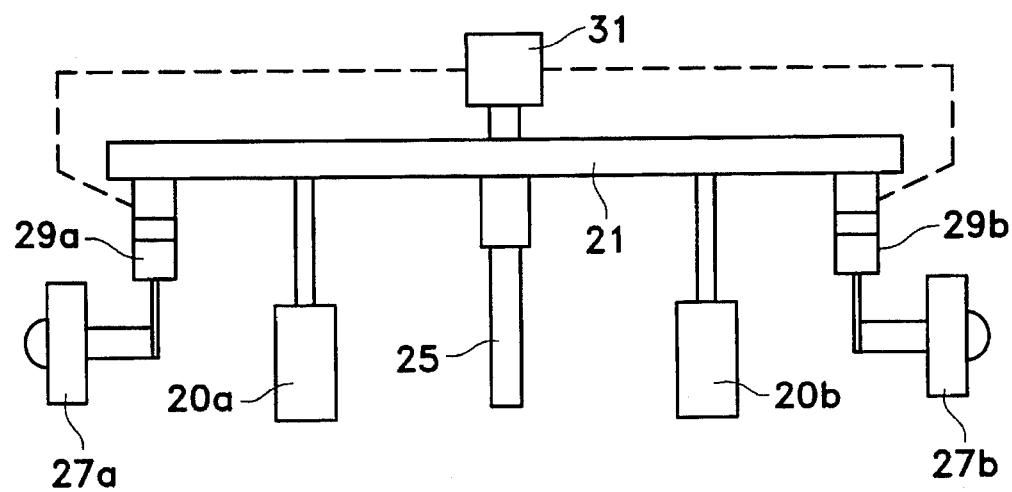
FIG. 2 is a front schematic view of an alternative embodiment of the invention.

Referring to FIG. 2, therein is illustrated an alternate embodiment of the present invention in which one or more, typically at least two separate planters 20a and b may be connected to a single mounting frame or bar 21 in turn pivotally connected to a frame (not shown) fixed to a tractor. One electrode pair 25 is connected to the center of frame 21. The arrangement is borne by support wheels 27a and 27b at opposite ends of the bar or frame. A control box 31 also mounted on the frame 21 is connected to the electrode pair and to a separate actuator 28a and 28b at each end of the frame or bar, for the purpose of lowering or raising frame 21 by means of actuators 29a and b. Control box 31 may include circuitry to synchronize vertical movement of the wheels or planters so that both actuators simultaneously cause the wheels or planter to move the same degree in the same direction, or to cause one side of the array to move in one direction, while the other side is caused to move in the same direction but to a different degree or is caused to remain at its present position or is caused to move in the opposite direct.

Figure 3A:
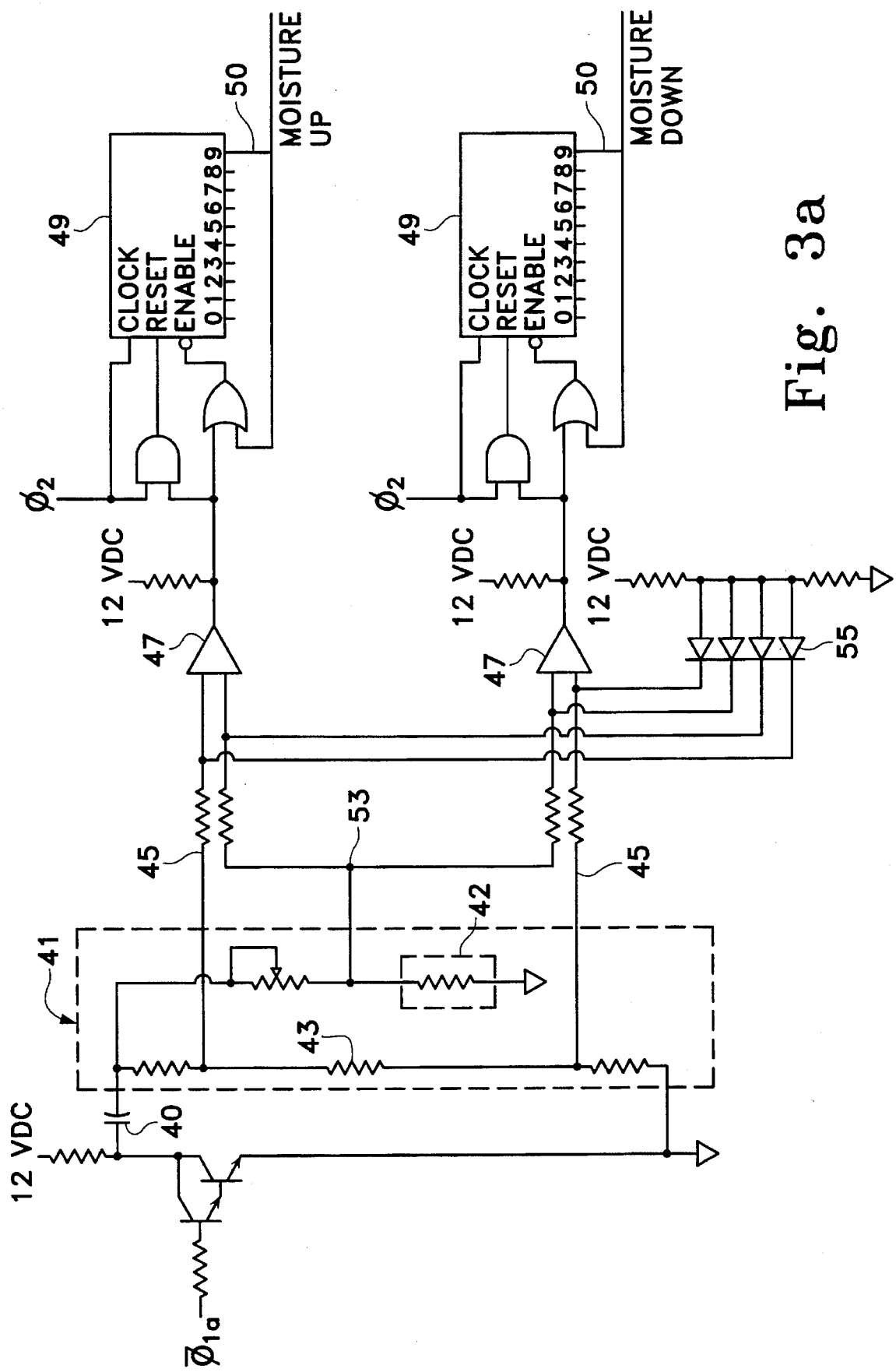
Figure 3B:
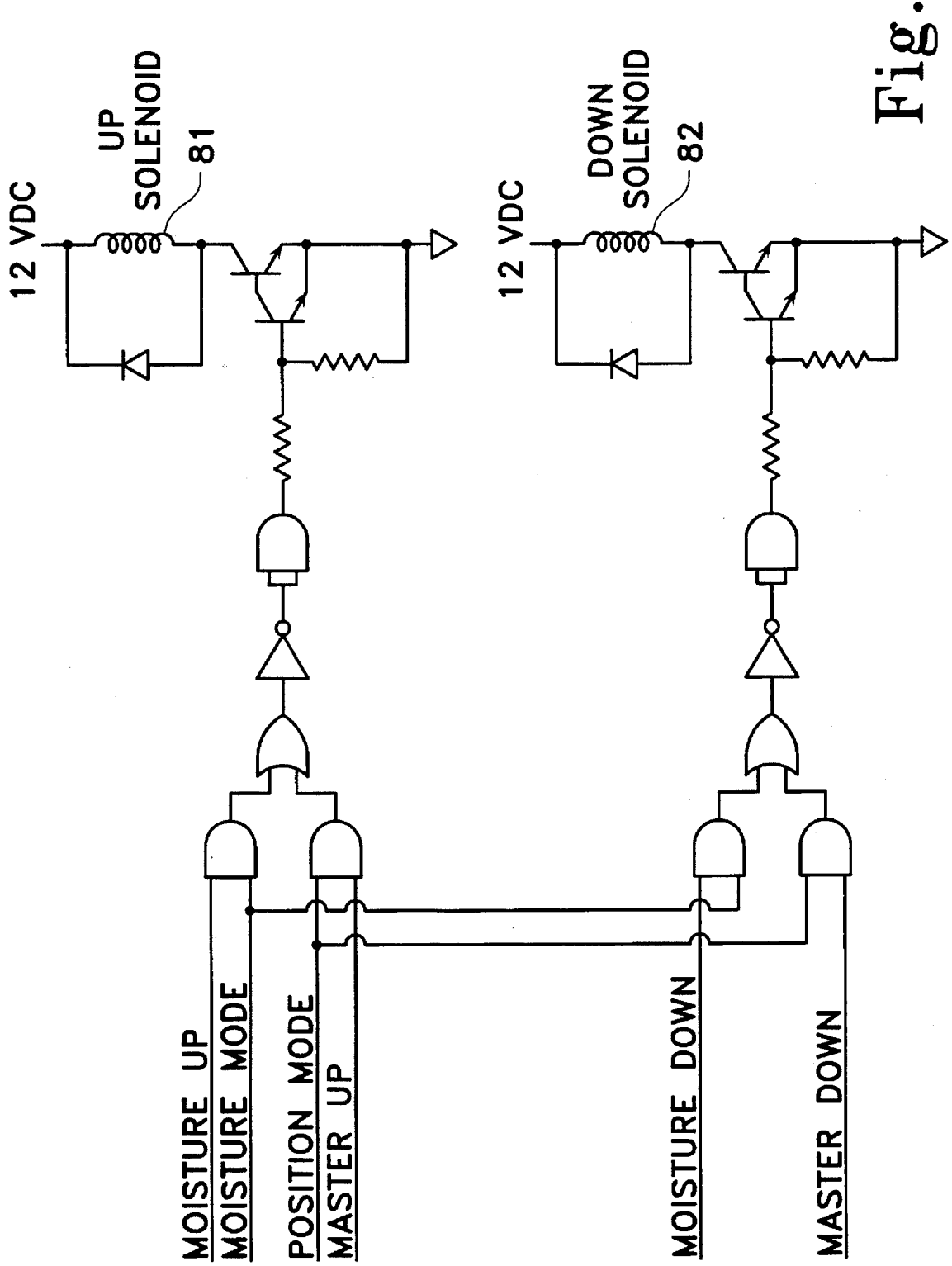

The electronic circuitry of the present invention is illustrated in FIGS. 3a–d. Referring first to FIG. 3a, the details of the bridge and delay circuitry are depicted therein. In operation a 5 kHz square wave voltage may be applied through a capacitor 40 to a resistance bridge 41 with the compacted soil ribbon resistance 42 as one element. Therefore, the excitation applied across the ribbon is an alternating polarity voltage ramp whose slope varies with soil resistance. The bridge is configured as a "window" comparator 43 with the window representing approximately 4% of the applied voltage. Signal voltages from either side of the bridge "window" and from the center of the active arm 45 are followed by voltage comparators 47 which convert the bridge balance state to binary values. The digital signals may be sampled twenty microseconds after the positive leading edge of excitation. When the sampled voltage across the soil ribbon is greater or less than the window limits, one of the count timers 49 is started. If the signal remains outside the window limits for ten consecutive cycles of the excitation voltage, or 0.2 seconds, the appropriate solenoid in FIG. 1 (reference numerals 81 and 82 in the output circuitry of FIG. 3b) is activated to move the agricultural implement up or down as commanded. Reference numeral 50 designates a connection tap in the circuitry that may be adjusted manually to vary the number of cycles before a solenoid is actuated.

At any time the bridge 41 returns to a "balanced" state or changed state, the counters and actuators are reset. This circuit helps to minimize false signals and mechanical oscillation.

The countdown sequence can be as long or short as needed by changing the connection tap 50 in FIG. 3a.

The only portion of the circuitry with voltages less than zero is isolated between the capacitor 40 and the bridge side of the voltage comparators 53 in FIG. 3a. At the input pins of the comparators, the voltage is clamped by a diode array 55 to a value above zero. Thus an alternating current is applied to the soil without the necessity for a dual power supply, and inexpensive digital integrated circuits (such as low speed CMOS) may be used for signal processing and control.

Figure 3C:
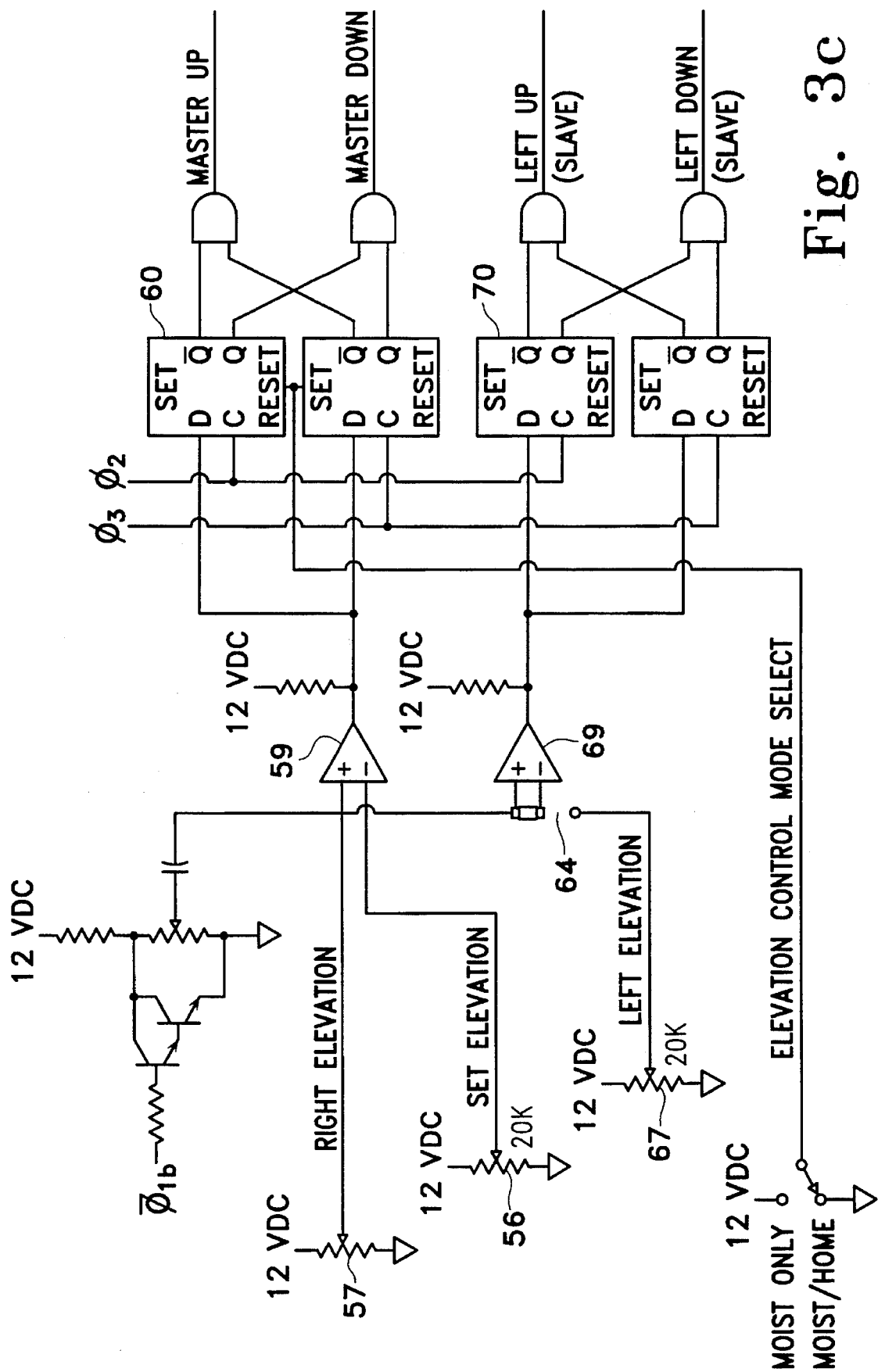
Figure 3D:
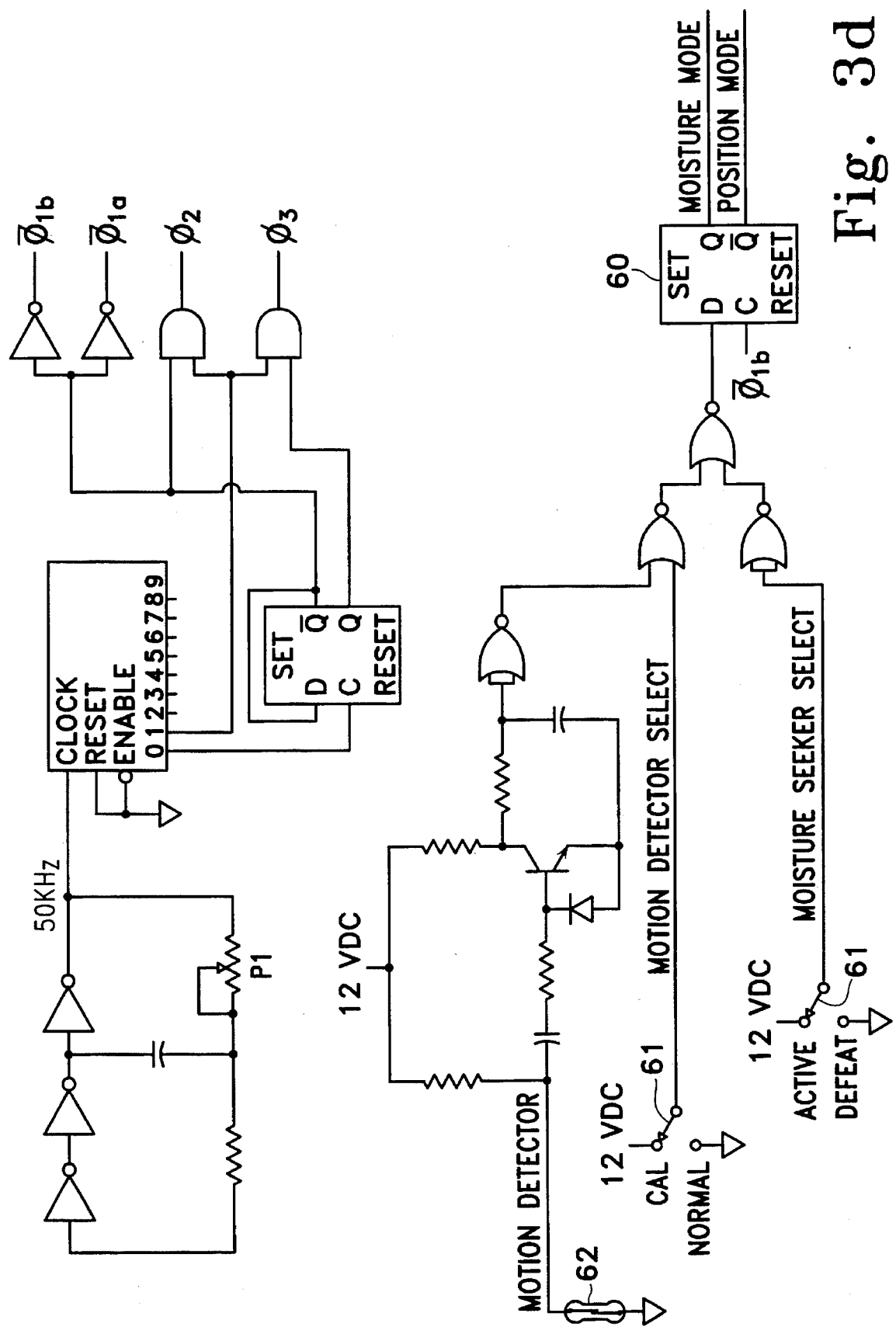

When the agricultural implement such as a planter is not moving in the field or is in the transport mode, the implement may be moved to a selected vertical position with respect to the implements wheels (if any) by comparator circuitry in the command circuitry of FIG. 3c using voltage comparators 59 and flip flops 60 which compare the voltage of the set elevation potentiometer 56 to the feedback potentiometer 57. In this mode, speed is sensed by a reed relay 62 in the timing clock circuitry and mode control of FIG. 3d actuated by a magnet connected to a shaft that only rotates when the implement wheels are in contact with the soil. When the frequency exceeds the rate sensing circuitry threshold, a latch 60 in FIG. 3d is opened shifting function of the control from maintaining the "home" position to following the soil moisture. Thus, the control system includes a vehicle motion detector system that commands the implement to return to a pre-selected position when no motion of the vehicle is detected or when vehicle speed falls below a predetermined value; or, alternatively, freezes the vertical position of the implement at the last commanded position when no motion is detected.

Referring again to FIG. 3c, logic and controls may be added for a separate left (or right) side "slave" control 64 since, in some applications, the position of two or more agricultural implements, such as planters, may be controlled as a single unit by hydraulically controlled planter gauge wheels on each end of a long tool bar as shown in FIG. 2, as opposed to an independent actuator directly connected to each planter. In this arrangement, a separate feedback potentiometer 67 is compared to the right side feedback potentionmeter 57 and the relative heights of the two sides of the tool bar adjusted by comparator 69 and flip flops 70 to maintain a level tool bar.

Convenience switches 61 in FIG. 3d may be added for special operations or testing, in order to defeat any control, whereby the implement may be operated in non-automatic modes, if desired.

In addition to the above, the circuitry of the present invention accepts unregulated 12 VDC power from a tractor battery, provides selectable discrete timed soil resistivity sampling, provides user switch positions for continuous operation, bypassing the motion detectors, and provides user switch positions to allow the user to select automatic control for sensed soil resistivity or manual mode allowing constant but user specified vertical height adjustment of the agricultural implement.

I claim:

1. In a means for altering vertical displacement of an agricultural implement as said implement and its motorized carrier travel across ground; wherein said altering means includes means to raise and lower said agricultural implement with respect to said carrier;

sensor means adjacent said implement and partly submerged in said ground for sensing the magnitude of electrical resistivity of soil in said ground; wherein said sensor means travels with said implement; wherein said sensor means comprises a positive electrode extending into said soil in a tilling-like manner, wherein said positive electrode is shaped at its lower end to compress said soil into a compacted narrow ribbon at said lower end, wherein said ribbon is generally parallel to and below the surface of said ground, and is adjacent and touching said electrode's lowest surface, as said electrode travels through said soil;

elevation control means connected to said sensor means and to said raising-lowering means so as to alter said vertical displacement of said implement and said sensor means when the sensed resistivity is different than a predetermined magnitude; the improvement comprising said sensor means having a negative electrode other than said agricultural implement itself, which negative electrode at least partly is submerged in said ground immediately behind said positive electrode in the direction of travel; wherein said negative electrode extends deep enough into said ground so as to contact said ribbon throughout the full thickness of said ribbon; wherein said positive and negative electrodes' forwardmost faces are wedge-shaped; and wherein said wedge shape on said positive electrode extends upward from immediately above said lower end of said positive electrode to above ground level, so that oncoming upper soil, as it contacts said wedge shape on said positive electrode, is prevented from moving downward toward said lower end.

2. In a means for altering vertical displacement of an agricultural implement as said implement and its motorized carrier travel across ground; wherein said altering means includes means to raise and lower said agricultural implement with respect to said carrier;

sensor means adjacent said implement and partly submerged in said ground for sensing the magnitude of electrical resistivity of soil in said ground; wherein said sensor means travels with said implement; wherein said sensor means comprises a positive electrode extending into said soil in a tilling-like manner, wherein said positive electrode is shaped at its lower end to compress said soil into a compacted narrow ribbon at said lower end, wherein said ribbon is generally parallel to and below the surface of said ground, and is adjacent and touching said electrode's lowest surface, as said electrode travels through said soil;

elevation control means connected to said sensor means and to said raising-lowering means so as to alter said vertical displacement of said implement and said sensor means when the sensed resistivity is different than a predetermined magnitude; the improvement comprising said sensor means having a negative electrode other than said agricultural implement itself, which negative electrode at least partly is submerged in said ground immediately behind said positive electrode in the direction of travel; wherein said negative electrode extends deep enough into said ground so as to contact said ribbon throughout the full thickness of said ribbon; and wherein said elevation control means includes (a) means to send a command signal to said raising-lowering means, and (b) means to delay said command signal for an adjustable predetermined period of time.

3. The apparatus of claim 2 wherein said control means includes means to sense forward movement of said agricultural implement and to prevent soil resistivity control of said implement when no forward movement, or forward movement below a predetermined magnitude, is sensed.

4. The apparatus of claim 3 wherein vertical displacement of said implement additionally is controlled by a variable other than soil resistivity; and said control means includes means to synchronize control of said vertical displacement by both variables.

5. The apparatus of claim 4 further including a side-by-side array of a plurality of said implements; wherein vertical displacement of said array is effected by at least two raising-lowering means at opposite ends of said array; and wherein said control means includes means to synchronize vertical displacement by each of said raising-lowering means.

6. The apparatus of claim 5 wherein said synchronized control means includes means to simultaneously effect different commands to each raising-lowering means.

7. In a means for altering vertical displacement of an agricultural implement as said implement and its motorized carrier travel across ground; wherein said altering means includes means to raise and lower said agricultural implement with respect to said carrier;

sensor means adjacent said implement and partly submerged in said ground for sensing the magnitude of electrical resistivity of soil in said ground; wherein said sensor means travels with said implement; wherein said sensor means comprises a positive electrode extending into said soil in a tilling-like manner, wherein said positive electrode is shaped at its lower end to compress said soil into a compacted narrow ribbon at said lower end, wherein said ribbon is generally parallel to and below the surface of said ground, and is adjacent and touching said electrode's lowest surface, as said electrode travels through said soil;

elevation control means connected to said sensor means and to said raising-lowering means so as to alter said vertical displacement of said implement and said sensor means when the sensed resistivity is different than a predetermined magnitude;

the improvement comprising said sensor means having a negative electrode other than said agricultural implement itself, which electrode at least partly is submerged in said ground immediately behind said positive electrode in the direction of travel; wherein said negative electrode extends deep enough into said ground so as to contact said ribbon throughout the full thickness of said ribbon; and wherein said control means includes means to sense forward movement of said agricultural implement and to prevent soil resistivity control of vertical displacement of said implement and sensor means when no forward movement, or forward movement below a predetermined magnitude, is sensed.

8. In a means for altering vertical displacement of an agricultural implement as said implement and its motorized carrier travel across ground; wherein said altering means includes means to raise and lower said agricultural implement with respect to said carrier;

sensor means adjacent said implement and partly submerged in said ground for sensing the magnitude of electrical resistivity of soil in said ground; wherein said sensor means travels with said implement; wherein said sensor means comprises a positive electrode extending into said soil in a tilling-like manner, wherein said positive electrode is shaped at its lower end to compress said soil into a compacted narrow ribbon at said lower end, wherein said ribbon is generally parallel to and below the surface of said ground, and is adjacent and touching said electrode's lowest surface, as said electrode travels through said soil;

elevation control means connected to said sensor means and to said raising-lowering means so as to alter said vertical displacement of said implement and said sensor means when the sensed resistivity is different than a predetermined magnitude;

the improvement comprising said sensor means having a negative electrode other than said agricultural implement itself, which electrode at least partly is submerged in said ground immediately behind said positive electrode in the direction of travel; wherein said negative electrode extends deep enough into said ground so as to contact said ribbon throughout the full thickness of said ribbon; and wherein said vertical displacement additionally is controlled by a variable other than soil resistivity; and said control means includes means to synchronize control of said vertical displacement by both variables.

9. In a means for altering vertical displacement of an agricultural implement as said implement and its motorized carrier travel across ground; wherein said altering means includes means to raise and lower said agricultural implement with respect to said carrier;

sensor means adjacent said implement and partly submerged in said ground for sensing the magnitude of electrical resistivity of soil in said ground; wherein said sensor means travels with said implement; wherein said sensor means comprises a positive electrode extending into said soil in a tilling-like manner, wherein said positive electrode is shaped at its lower end to compress said soil into a compacted narrow ribbon at said lower end, wherein said ribbon is generally parallel to and below the surface of said ground, and is adjacent and touching said electrode's lowest surface, as said electrode travels through said soil;

elevation control means connected to said sensor means and to said raising-lowering means so as to alter said vertical displacement of said implement and said sensor means when the sensed resistivity is different than a predetermined magnitude;

the improvement comprising said sensor means having a negative electrode other than said agricultural implement itself, which electrode at least partly is submerged in said ground immediately behind said positive electrode in the direction of travel; wherein said negative electrode extends deep enough into said ground so as to contact said ribbon throughout the full thickness of said ribbon; and further including a side-by-side array of a plurality of said implements; wherein vertical displacement of said array is effected by at least two raising-lowering means at opposite ends of said array; and wherein said control means synchronizes vertical displacement by each of said raising-lowering means.

10. The apparatus of claim 9 wherein said control means further includes means to simultaneously effect different commands to each raising-lowering means.

11. Apparatus for altering vertical displacement of an agricultural implement as said implement and its motorized carrier travel over a field comprising a. means to raise and lower said agricultural implement with respect to said motorized carrier;

b. sensor means adjacent said implement for sensing the magnitude of electrical resistivity of soil in said field wherein said sensor means is raised or lowered each time said implement is raised or lowered;

c. elevation control means connected to said sensor means and to said raising-lowering means so as to alter said vertical displacement of said implement and said sensor means when sensed resistivity is different than a predetermined magnitude; said control means including i. means to send a command signal to said raising-lowering means in response to sensed resistivity;

ii. means to delay said command signal for an adjustable predetermined period of time;

iii. means to sense forward movement of said agricultural implement; and iv. means to prevent soil resistivity control of said implement when no forward movement, or forward movement below a predetermined magnitude, is sensed.

12. The apparatus of claim 11 further wherein said vertical displacement additionally is controlled by a variable other than soil resistivity; and said control means includes means to synchronize control of said vertical displacement by both variables.

13. The apparatus of claim 11 further including a side-by-side array of a plurality of said implements; wherein vertical displacement of said array is effected by raising-lowering means at opposite ends of said array; and wherein said control means includes means to synchonize vertical displacement by each of said raising-lowering means.

14. The apparatus of claim 13 wherein said synchronized control means includes means to simultaneously effect different commands to each raising-lowering means.

15. In a method for controlling vertical displacement of an agricultural implement as said implement and its motorized carrier are travelling over a field;

wherein electrical resistivity of soil adjacent to said implement is measured by electrode means that are partly submerged in said field and are moving forward with said implement;

wherein the positive electrode of said electrode means compresses soil at its lower end into a compacted narrow ribbon which is generally parallel to but below the surface of said field, and is adjacent and touching said positive electrode's lowest surface, as said positive electrode travels through said soil;

wherein vertical displacment of said implement and said electrode means is controlled in response to said measurement, so as to maintain said implement and said electrode means at a substantially constant level of soil moisture in said field as said implement moves across said field;

the improvement comprising
 a. providing a negative electrode other than parts of the implement itself;
 b. causing said compacted ribbon of soil to extend from said positive electrode to said negative electrode as said carrier travels over said ground;
 b. preventing said compacted ribbon from reaching any parts of said implement;
 c. measuring said electrical resistivity along said compacted ribbon that extends from said positive electrode to said negative electrode; and
 d. scouring said negative electrode's forwardmost face with oncoming soil so as to provide an effective electrode surface of substantially constant size, as said motorized carrier travels over said field, and
 further including preventing oncoming soil, as it contacts said positive electrode above said lower end, from moving downward toward said lower end.

16. The method of claim 15 further including
 a. generating a command signal to raise or lower said implement and electrode means in response to said measurement of soil resistivity;
 b. delaying said command signal for an adjustable period of time;
 c. sensing the magnitude of forward movement of said implement; and
 d. preventing soil resistivity control of said implement when no forward movement, or forward movement below a predetermined magnitude, is sensed.

17. The method of claim 16 further including
 a. controlling extension of said implement into said soil in response to a second variable other than soil resistivity; and
 b. synchronizing control of said implement in response to measurements of said soil resistivity and said second variable.

18. The method of claim 16 further including
 a. providing a side-by-side array of a plurality of said implements;
 b. separately controlling vertical movement of said array at opposite ends of said array; and
 c. synchronizing said vertical movement control at each end.

19. The method of claim 18 further including simultaneously effecting different commands at each end of said array during said synchronizing step.

20. A method for controlling vertical displacement of an agricultural implement as said implement and its motorized carrier are moving forward over a field comprising a. measuring electrical resistivity of soil adjacent to said implement by electrode means that are partly submerged in said field and are moving forward with said implement;
 b. generating a command signal to raise or lower said implement in response to said measurement of soil resistivity;
 c. delaying said command signal for an adjustable period of time;
 d. controlling said vertical displacment of said implement in response to said command signal, so as to maintain said implement at a substantially constant level of soil moisture in said field as said implement moves over said field; wherein said electrode means is vertically displaced to the same degree as said implement each time said implement is vertically displaced;
 e. sensing the magnitude of forward movement of said implement; and
 f. preventing soil resistivity control of said implement when no forward movement, or forward movement below a predetermined magnitude, is sensed.

21. The method of claim 20 further including
 a. controlling extension of said implement into said soil in response to a second variable other than soil resistivity; and
 b. synchronizing control of said implement in response to measurements of said soil resistivity and said second variable.

22. The method of claim 20 further including
 a. providing a side-by-side array of a plurality of said implements;
 b. separately controlling vertical movement of said array at opposite ends of said array; and
 c. synchronizing said vertical movement control at each end.

23. The method of claim 22 further including simultaneously effecting different commands at each end of said array during said synchronizing step.

24. In a means for altering vertical displacement of an agricultural implement as said implement and its motorized carrier travel across ground; wherein said altering means includes means to raise and lower said agricultural implement with respect to said carrier;

sensor means adjacent said implement and partly submerged in said ground for sensing the magnitude of electrical resistivity of soil in said ground; wherein said sensor means travels with said implement; wherein said sensor means comprises a positive electrode extending into said soil in a tilling-like manner, wherein said positive electrode is shaped at its lower end to compress said soil into a compacted narrow ribbon at said lower end, wherein said ribbon is generally parallel to and below the surface of said ground, and is adjacent and touching said electrode's lowest surface, as said electrode travels through said soil;

elevation control means connected to said sensor means and to said raising-lowering means so as to alter said vertical displacement of said implement and said sensor means when the sensed resistivity is different than a predetermined magnitude;

the improvement comprising
 said sensor means having a negative electrode other than said agricultural implement itself, which electrode at least partly is submerged in said ground immediately behind said positive electrode in the direction of travel; wherein said negative electrode extends deep enough into said ground so as to contact said ribbon throughout the full thickness of said ribbon; wherein said negative electrode's forwardmost face is wedge-shaped; and wherein said positive electrode, at said lower end, continuously slopes downwardly and rearwardly; wherein said slope is at least 10°.

* * * * *